(12) United States Patent
Vutharkar et al.

(10) Patent No.: US 8,204,979 B2
(45) Date of Patent: Jun. 19, 2012

(54) ADAPTIVE CLIENT/SERVER CONTROL PROTOCOL

(75) Inventors: Viswa P. Vutharkar, Roseville, CA (US); Terry Robison, Lincoln, CA (US); Shawn Troy White, West Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1046 days.

(21) Appl. No.: 11/701,305

(22) Filed: Jan. 31, 2007

(65) Prior Publication Data

US 2008/0184234 A1    Jul. 31, 2008

(51) Int. Cl.
*G06F 15/00* (2006.01)
*G06F 15/173* (2006.01)
(52) U.S. Cl. ......... 709/224; 709/203; 709/232; 719/318
(58) Field of Classification Search .......... 718/100–108; 709/223–226, 232, 203
See application file for complete search history.

(56) References Cited

U.S. PATENT DOCUMENTS

| | | | | |
|---|---|---|---|---|
| 6,185,613 B1* | 2/2001 | Lawson et al. | ................ | 709/224 |
| 6,823,504 B1* | 11/2004 | Sokolov | ........................ | 717/136 |
| 6,892,225 B1* | 5/2005 | Tu et al. | ........................ | 709/217 |
| 6,910,070 B1* | 6/2005 | Mishra et al. | ................ | 709/224 |
| 7,047,484 B1* | 5/2006 | Becker et al. | ................ | 715/201 |
| 7,178,051 B2* | 2/2007 | Barr et al. | ........................ | 714/4 |
| 2003/0005129 A1* | 1/2003 | Scheinkman | ................ | 709/227 |
| 2004/0010717 A1* | 1/2004 | Simec et al. | ................. | 713/201 |
| 2005/0027846 A1* | 2/2005 | Wolfe et al. | ................... | 709/223 |

* cited by examiner

*Primary Examiner* — Ian N Moore
*Assistant Examiner* — Thai Nguyen

(57) ABSTRACT

In various embodiments of the present invention, tiered command-propagation methods are employed within client computers to ensure that monitoring-and-management-related commands are reliably propagated from server computers to client computers. When possible, command propagation is initiated by server computers through a notification process. When the notification process is inoperable, client computers poll one or more monitoring-and-management server computer for commands. When a failed or interrupted notification process is subsequently restored to operability, client computers automatically discontinue command polling and resume relying on server notification for command propagation.

20 Claims, 13 Drawing Sheets

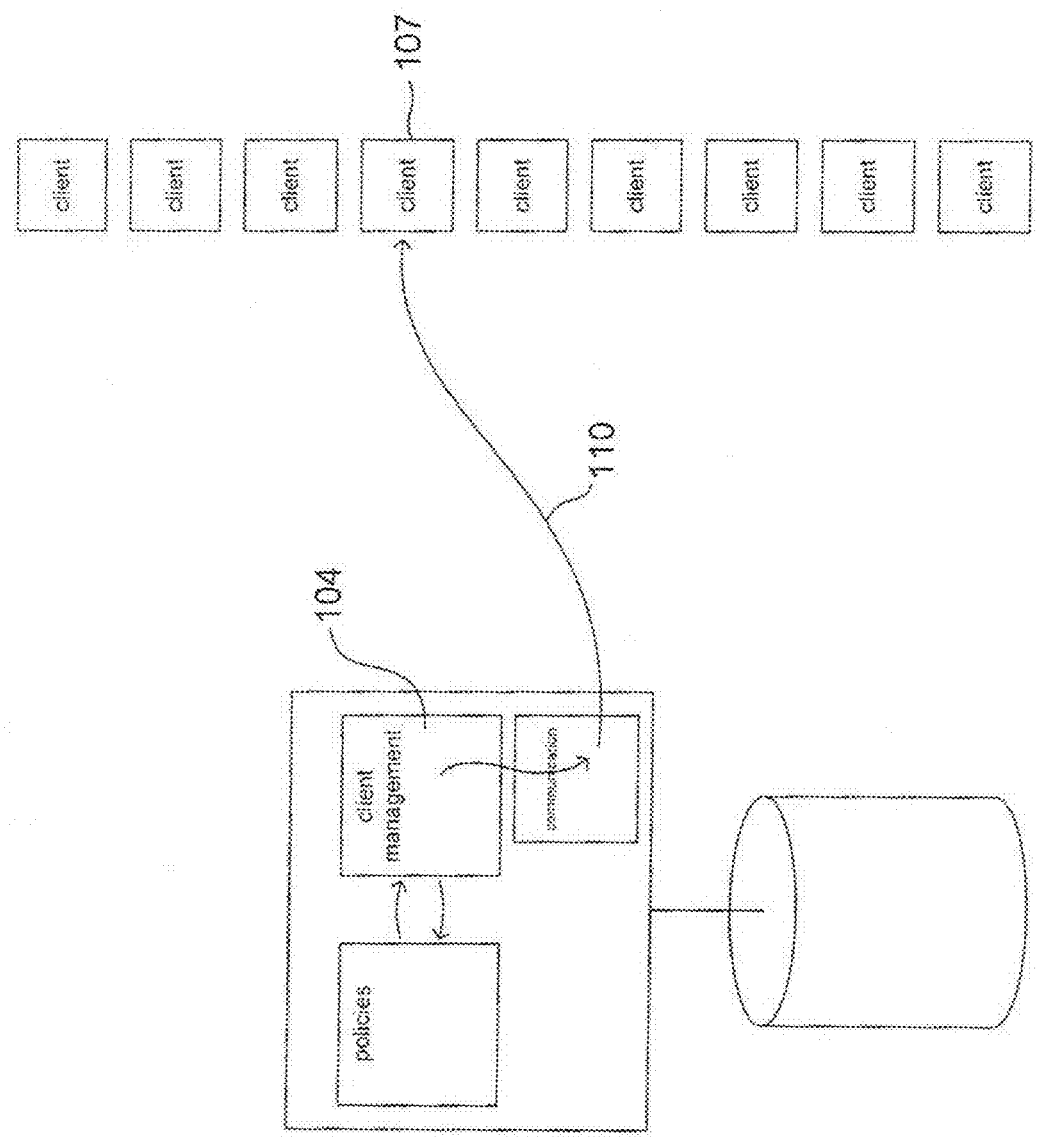

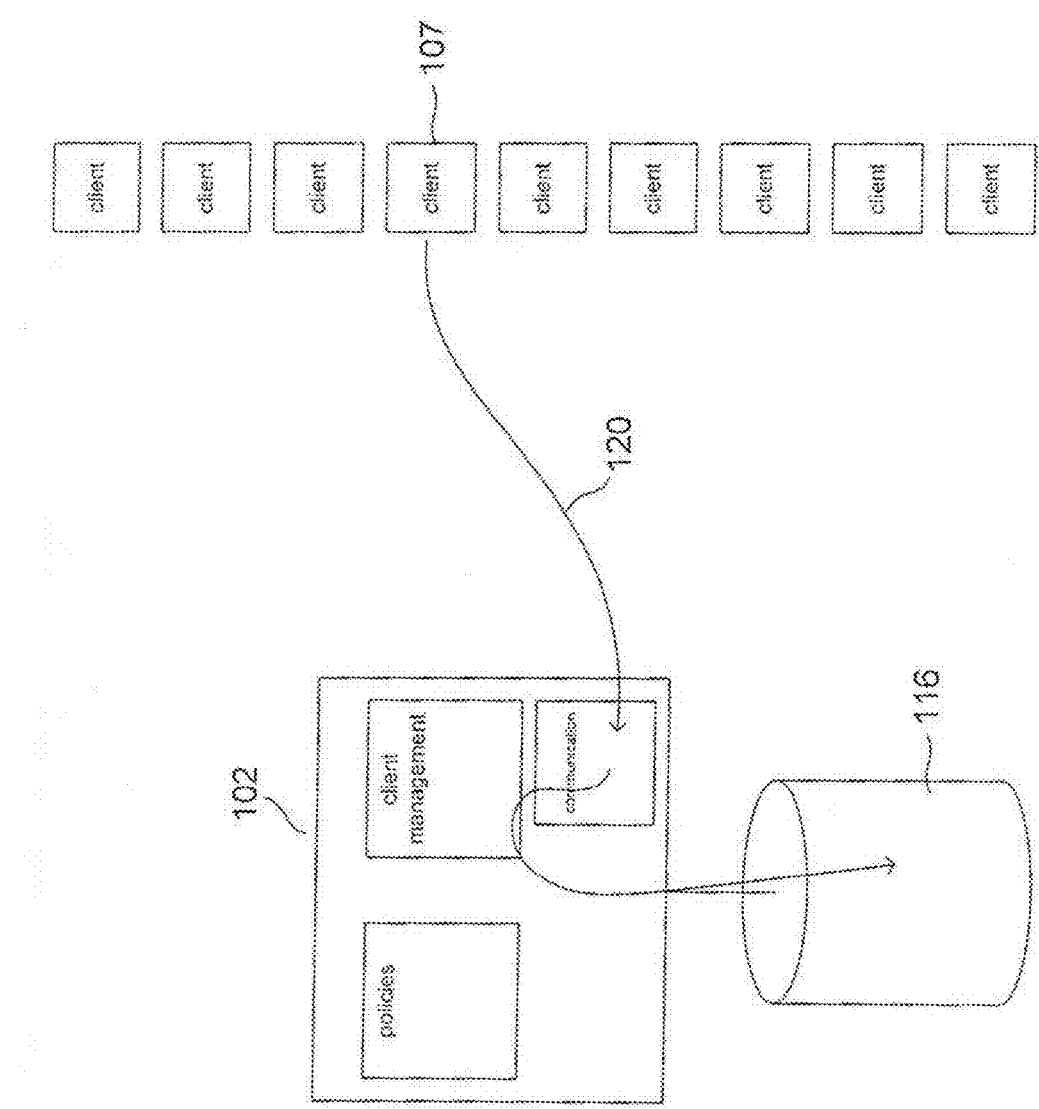

ADAPTIVE CLIENT/SERVER CONTROL PROTOCOL

TECHNICAL FIELD

The present invention is related to communications protocols and server-based management of client computers and, in particular, to an adaptive control protocol that facilitates automatic, continuous management, by one or more server computers, of client computers interconnected with the one or more server computers through the adaptive client/server control protocol.

BACKGROUND OF THE INVENTION

As the costs of computer systems have continued to decrease, while the capabilities of computer systems have increased at remarkable rates, personal computers and work stations have become ubiquitous in office, manufacturing, education, and home environments. As the number of personal computers and workstations used in these environments has increased, monitoring and management tasks associated with the personal computers and work stations have correspondingly increased in volume and complexity, and have become a costly and complex burden for many organizations and individuals. As a result, significant research and development efforts have been directed to automating, as much as possible, monitoring and managing tasks, including data backup, security monitoring, software-update management, configuration management, and other such tasks. Effective automated, remote monitoring and management of computers and work stations depends on monitoring and management software running on remove server computers as well as on robust and reliable communications systems that interconnect these remote server computers with the personal computers and work stations, referred to collectively, in the following discussion, as client computers. Manufacturers and developers of monitoring and management software, monitoring-and-management-service providers, and the many different types of organizations and individuals have all recognized the need for increasingly robust and reliable client/server control protocols for interconnecting client computers to remote monitoring-and-management server computers.

SUMMARY OF THE INVENTION

In various embodiments of the present invention, tiered command-propagation methods are employed within client computers to ensure that monitoring-and-management-related commands are reliably propagated from server computers to client computers. When possible, command propagation is initiated by server computers through a notification process. When the notification process is inoperable, client computers poll one or more monitoring-and-management server computer for commands. When a failed or interrupted notification process is subsequently restored to operability, client computers automatically discontinue command polling and resume relying on server notification for command propagation.

BRIEF DESCRIPTION OF THE DRAWINGS

FIGS. 1A-D illustrate the client-computer monitoring and management environment in which the adaptive control protocols that represent embodiments of the present invention find use.

DETAILED DESCRIPTION OF THE INVENTION

Figure 1A:
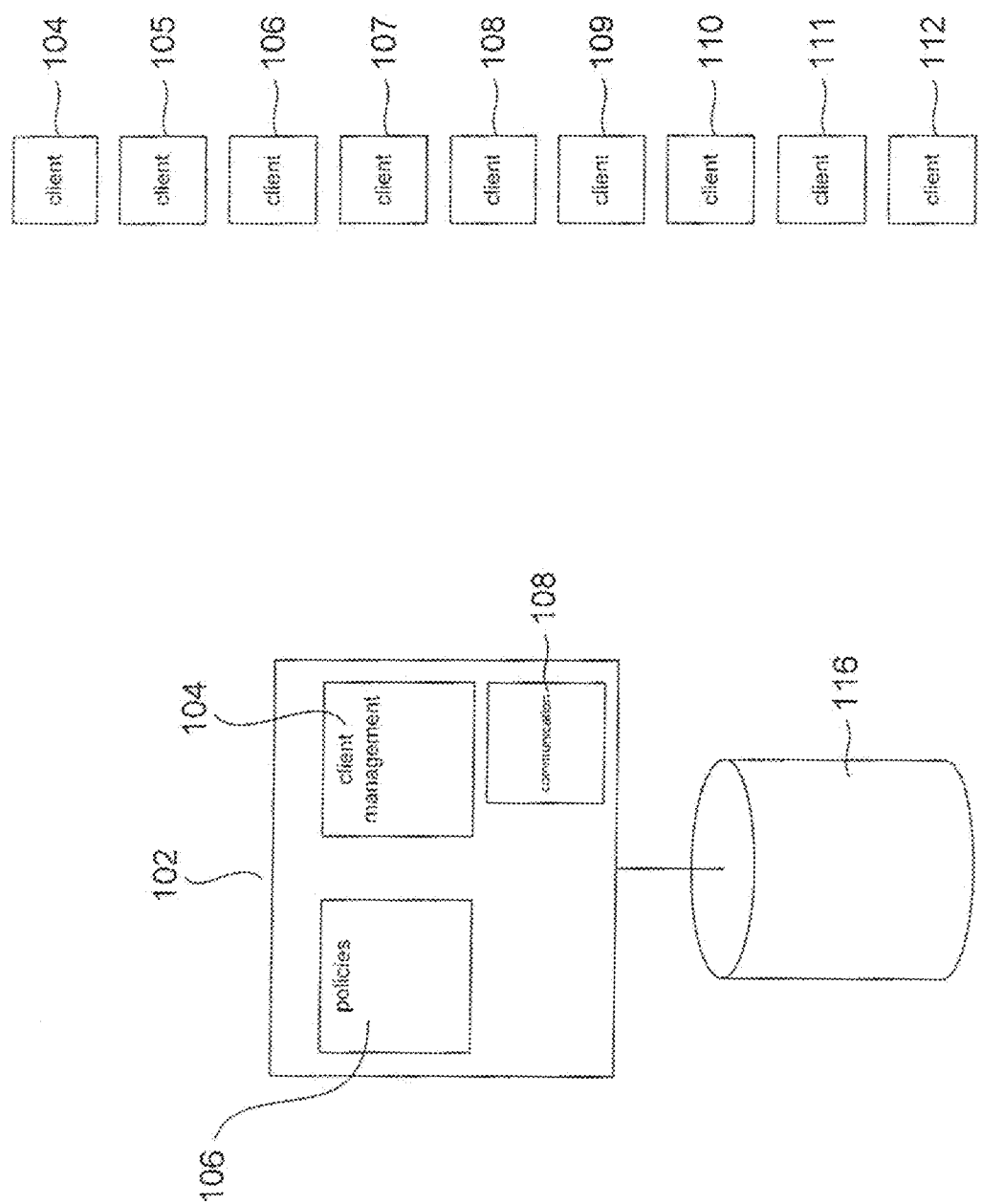

The present invention is directed to a robust, reliable, and cost-effective adaptive protocol for interconnecting server computers running monitoring-and-management software with client computers that are monitored and managed by the server computers. The control protocols are adaptive, in that protocol characteristics are automatically monitored and adapted to changing conditions. The control protocols are robust and reliable in that various temporary and longer-duration failures and problems can be tolerated by the control protocol, without significant interruption of command propagation from server computers to client computers. The control protocols are cost effective because, in many cases, existing, already-implemented communications components may be used in both server and client computers to implement the control protocol. In addition, use of existing communications components significantly contributes to robustness and reliability, since many of these components are widely used in a variety of different applications, and are therefore extremely well tested and constantly updated.

FIGS. 1A-D illustrate the client-computer monitoring and management environment in which the adaptive control protocols that represent embodiments of the present invention find use. FIGS. 1A-D all employ the same illustration conventions, described below with reference to FIG. 1A. For simplicity, a single-server computer 102 is shown, together with a number of client computers. In more complex environments, multiple server computers, including multi-processor server computers, distribute monitoring and managing tasks among themselves, storing and retrieving data from remote disk arrays, in order to monitor and manage large numbers of client computers. However, for the purposes of the present discussion, description of a single-server environment is sufficient to describe the family of adaptive control protocols that represent embodiments of the present invention.

The server computer 102 includes client-management routines 104 that together provide a client-management interface to administrators, a client-computer interface through adaptive control protocols that represent embodiments of the present invention, and that may employ various internal interfaces to additional components of the client-computer monitoring-and-management system, as well as to an operating system, database management systems, file systems, and other such components. The client-management routines rely on stored policies 106 and other stored information that characterize particularized monitoring and management tasks that need to be performed for individual client computers. These policies and other information may be cached in memory and stored internally or remotely on mass-storage devices. The client-management routines 104 also rely on a communications component 108 through which data and commands can be transferred between the server computer 102 and the number of client computers 104-112. The server computer 102, as discussed above, may be connected to any of a variety of different types of local or remote data-storage systems, represented in FIG. 1A by a disk-like component 110.

Figure 1B:
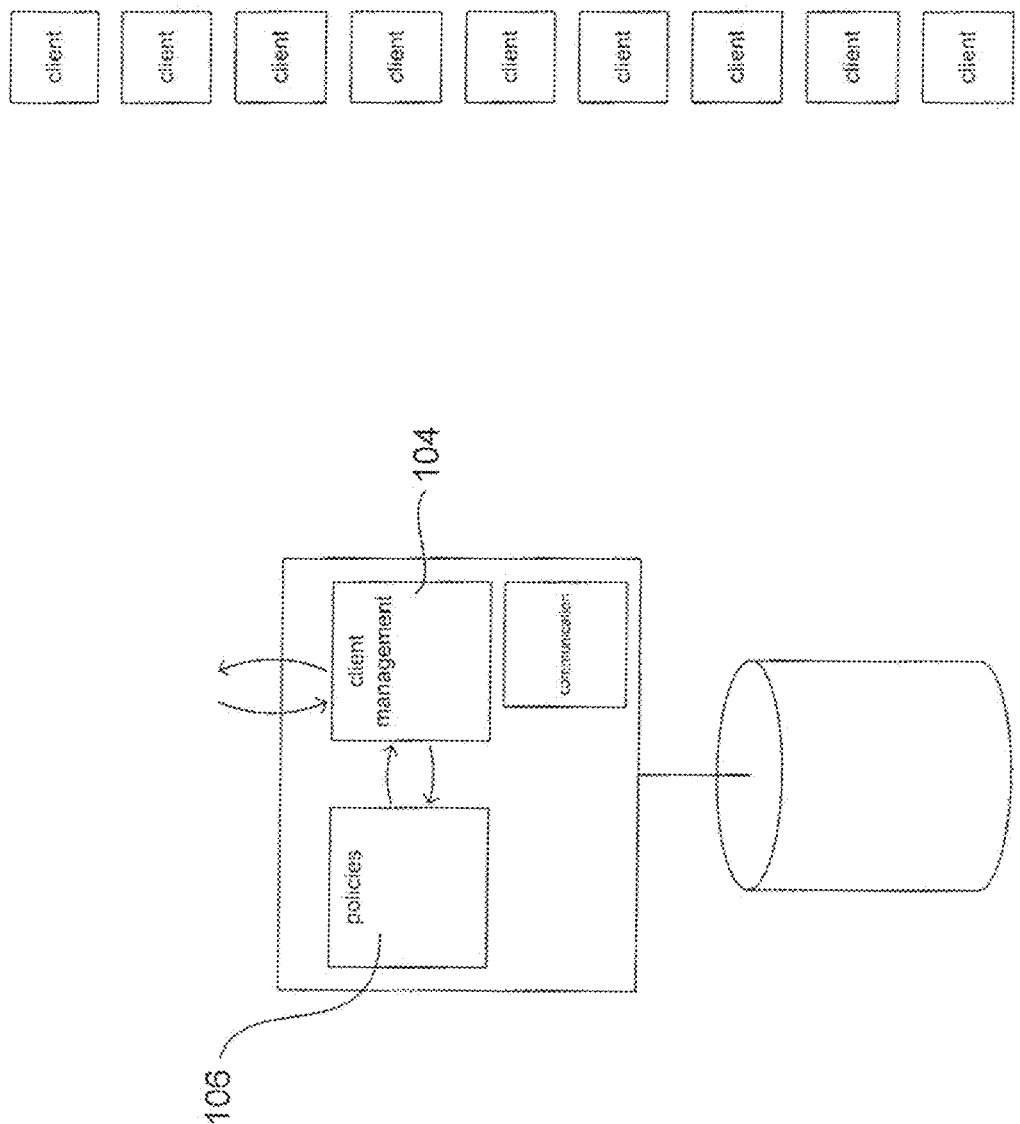

FIG. 1B illustrates an interface between the client-management routines of the server computer and external administrators. As discussed above, the client-management routines 104 implement an administration interface to allow administrators to set, update, manage, and delete management policies 106. Administrators may be human administrators that interact with the client-management routines through a graphical user interface displayed on a local or remote display device, and may also be automated administrator proxies that run locally or remotely on behalf of external administration services and remote human administrators. Because the policies and other information that characterizes and controls provision of monitoring-and-management services by the server computer to various client computers are stored on the server computer, the monitoring-and-management services may be significantly more robust and reliable than systems in which such policies and information are stored on client computers. The policies and other control information can be reliably stored on multiple local and remote mass-storage devices by the server computer to achieve high levels of fault tolerance and availability that cannot be achieved, or that can be achieved only at large expense, on client computers. Centralized storing of these policies and other information also provides more efficient, centralized control, management, and updating of the policies and other information.

FIGS. 1C-D illustrate a typical monitoring-and-management service provided by the service computer to client computers. In FIG. 1C, the client-management routines 104 continuously access and monitor the stored policies and other information to determine when specific management tasks may need to be undertaken. For example, in FIG. 1 C, the client-management routines may discover, by accessing the policies and other information, that a particular client computer 107 should be backed up at the current time. The client-management routines 104 therefore send a backup notification 110 to the client computer 107. As shown in FIG. 1D, the client computer 107 may then undertake, through an exchange of messages and data, to collect and forward 120 the data that needs to be backed up to the server computer 102 for processing and storage on one or more storage devices 116 available to the server computer 102.

Because policies and other information are stored on the server computer, it is important that, when the client-management routines on the server computer identify tasks and operations that need to be carried out on behalf of client computers, commands representing these tasks and operations be propagated reliably and in timely fashion to the client computers. However, a variety of different types of failures, both long-term and of short duration, may conspire to inhibit or prevent command propagation. For example, client computers within organizations may become isolated from the server computer due to installation of firewalls, security software, or additional up-stream computing facilities within the organization. In such cases, a given communications link that previously interconnected the server computer and the client computer may be interrupted or made inoperable. In addition, client computers may intermittently be taken off line, shut down for maintenance purposes, or otherwise become unavailable for communicating with the server computer. It is important for automated monitoring-and-management services that such communications and computer failures be recognized and automatically overcome, so that monitoring and management services can continue to be provided by the server computer to the client computers in a timely fashion. For example, were a client computer to lose a communications link by which the client computer communicates with the server computer, and were the client computer to therefore fail to be backed up, then a subsequent mass-storage-device failure on the client computer may prove to be catastrophic. For this reasons, the adaptive control protocols that represent embodiments of the present invention are able to recognize such failures and to employ alternative communications methods in order to continue provision of monitoring-and-management services by the server computer to the client computers. Moreover, failure detection and adaptive response is generally automatic, and does not require human intervention. In various embodiments of the present invention, the server computer may maintain an internal command cache to ensure that commands intended for propagation to a client computer are not lost due to communications failures or client-computer failures. Moreover, embodiments of the present invention may separate command propagation from data transfer, so that command propagation may continue even when data-transfer facilities are interrupted or fail, and vice versa. Separation of command-propagation communications from data-transfer communications may also facilitate communications load balancing on client computers. Finally, the adaptive control protocols that represent embodiments of the present invention are generally implemented using existing communications components and services that are used for other purposes and that are widely available from software and hardware vendors. By using existing components, both the reliability and robustness of the adaptive control protocols are increased, and the cost may be significantly decreased in comparison to de novo implementation.

Figure 2:
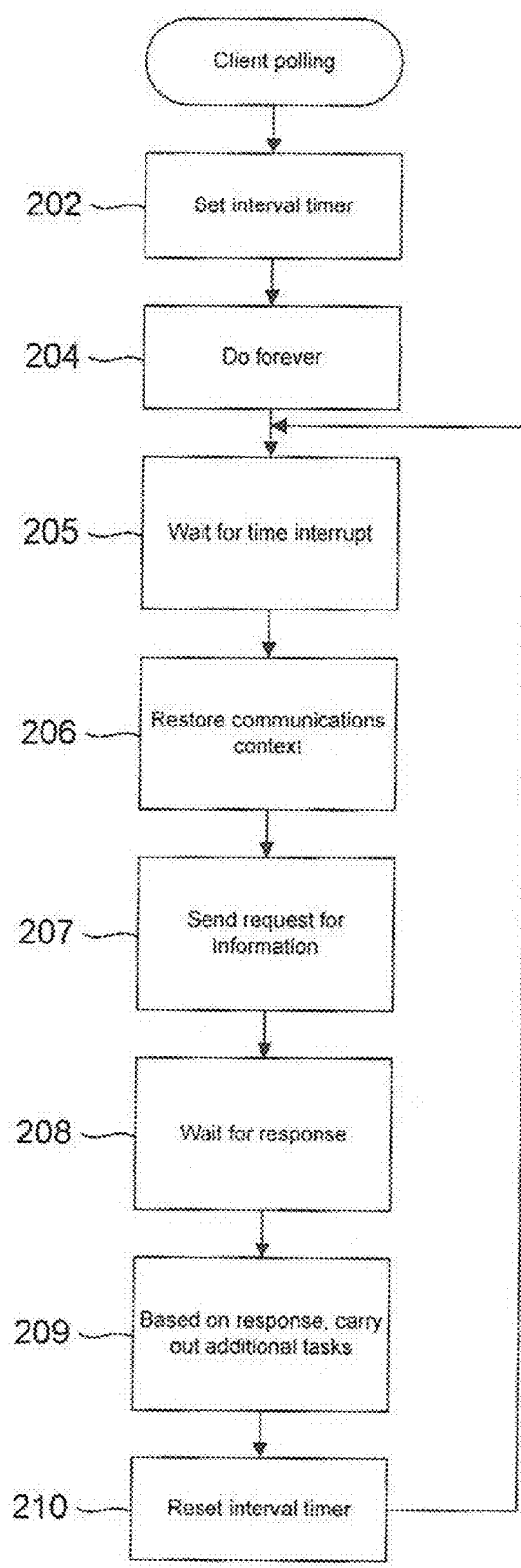
FIG. 2 is a control-flow diagram that illustrates client polling.

There are two main models for command propagation from the server computer to a client computer. A first model involves client polling of the server computer. FIG. 2 is a control-flow diagram that illustrates client polling. FIG. 2 illustrates one particular type, or style, of client polling, although many different client-polling techniques may be used. First, in step 202, an interval timer is set to generate an alarm, or timer-expiration event, at a future point in time that represents a next polling time interval. Then, in the continuous loop of steps 204-210, the client waits for the interval-timer interrupt, in step 205, and, upon receiving the timer interrupt or timer-expiration event, restores a communications context, in step 206, sends a request for command information to the server via the communications context, in step 207. A communications context is generally a process or thread that, along with underlying operating-system routines and hardware, allows for data to be transferred between a client computer and a remote computer. In step 208, the client waits for a response from the server and, when the response is received, carries out tasks associated with any commands included in the response in step 209. In step 210, the interval timer is reset, and the continuous loop iterates again. Of course, the client computer generally concurrently carries out many different tasks and executes many different processes while waiting for a next interval-timer interrupt. Moreover, the client computer carries out additional tasks and executes different processes during the time that the client computer waits for a response, in step 208, from the server computer.

While client polling is effective in polling commands from the server, client polling generally involves significant overhead on the client computer. In particular, restoration of a communications context, in step 206, may involve significant data-transfer overhead. Moreover, the polling process is continuous, so that the overhead is continuously repeated, at regular intervals, even when no commands are available from the server. In many monitoring-and-management services, commands may be quite infrequently made available. For example, backup commands may be issued on a daily or even weekly basis. Therefore, client polling may represent a significant computational overhead in view of infrequent command propagation.

Figure 3:
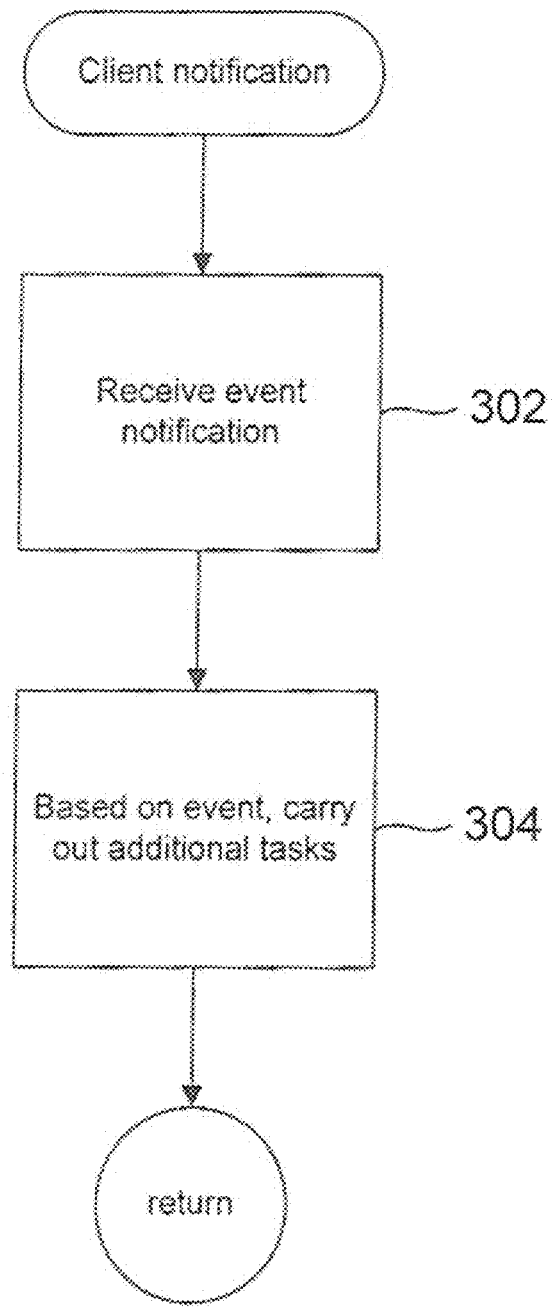
FIG. 3 illustrates a second command-propagation method.

FIG. 3 illustrates a second command-propagation method. This second command-propagation method involves notification, by the server computer, when commands become available on the server computer for propagation to client computers. In this case, the client receives a notification event, in step 302, and based on the event, carries out any additional tasks associated with the event 304. For example, in many embodiments of the present invention, the client may then launch a process that fetches the command from the server computer and carries out processing tasks associated with the command. In this second command-propagation method, the client computer does not expend significant computation overhead monitoring the server computer for command availability. Instead, in general, an existing event-notification service, used for other purposes on the client computer, may be employed by the server computer to asynchronously notify the client computer upon availability of commands on the server computer.

Figure 4A:
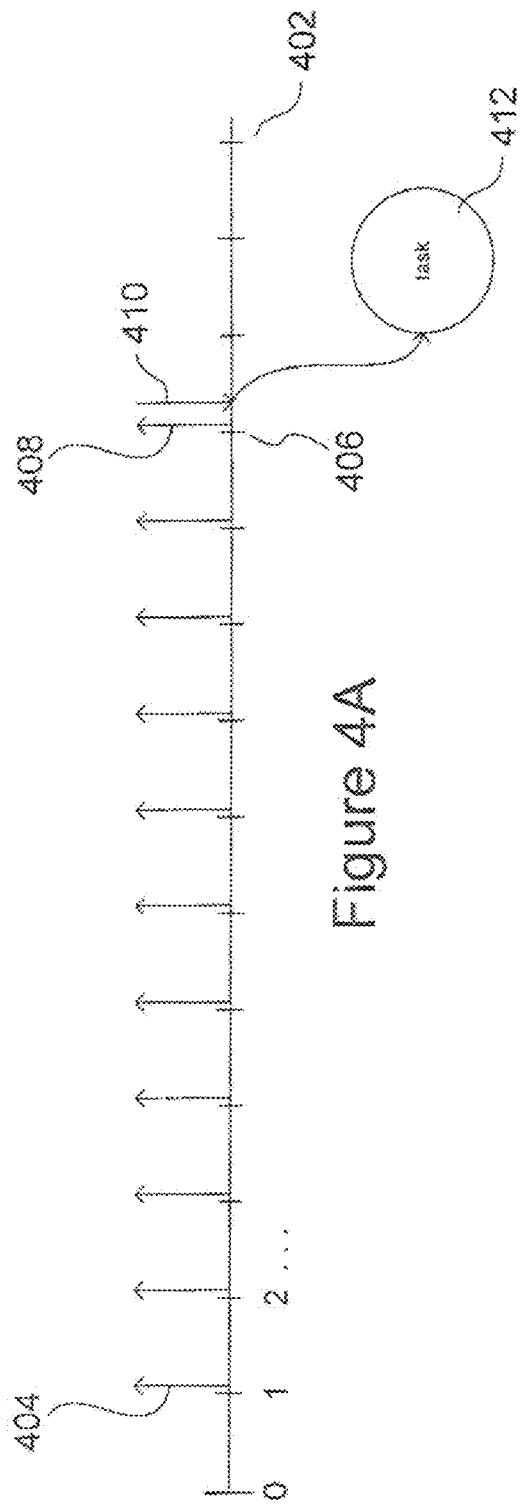
FIGS. 4A-B compare the two command-propagation methods described above with reference to FIGS. 2 and 3, respectively.
Figure 4B:
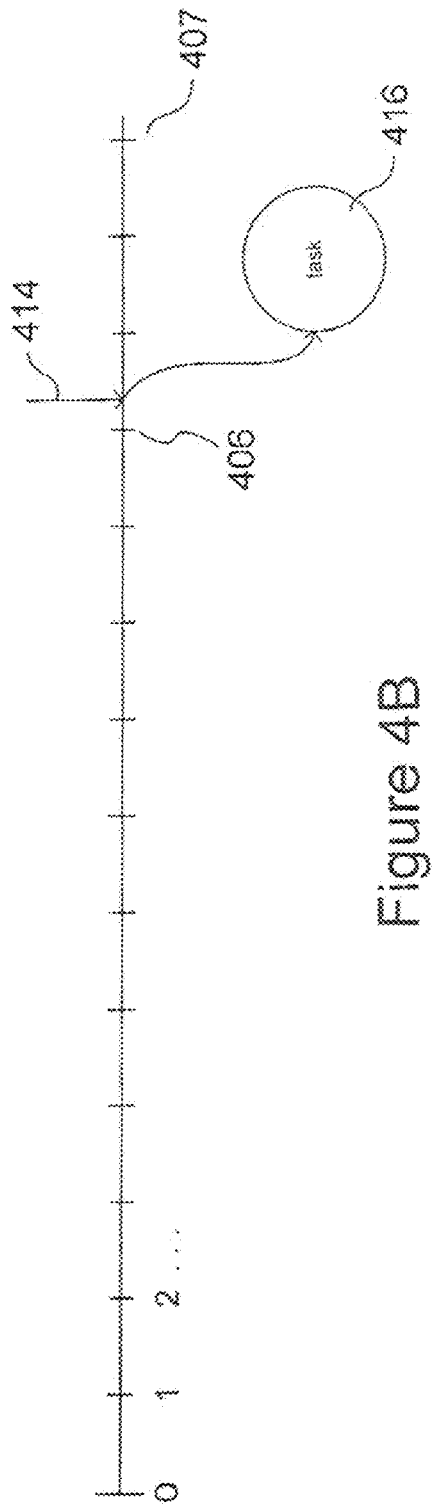

FIGS. 4A-B compare the two command-propagation methods described above with reference to FIGS. 2 and 3, respectively. As shown in FIG. 4A, over an interval of time represented by a horizontal time axis 402, a client computer needs to repeatedly poll the server computer, where each request sent by the client computer to the server computer is represented, in FIG. 4A, by a vertical arrow, such as vertical arrow 404. Eventually, at some subsequent point in time 406, a request for a command through a polling operation 408 may solicit a command response 410 from the server computer that results in the client computer executing tasks associated with the command 412. By contrast, as shown in FIG. 4B, using the notification-based command-propagation method, the client computer essentially does nothing until the point in time 406 when a command becomes available from the server, communicated to the client computer by an asynchronous notification 414. Upon reception of the notification, the client computer undertakes those tasks 416 needed to fetch and carry out the command.

Many existing control protocols rely on only one of the two command-propagation methods, discussed above, for propagating commands between the server computer and the client computers. Failure of the notification process may be deleterious or fatal to continued command propagation, when only a notification method is employed. While the client-polling method may provide better reliability, with regard to certain types of failures and degradations, the client-polling process can be computationally expensive, as discussed above.

In order to enhance reliability and robustness, achieve greater cost effectiveness, and minimize computational overhead, embodiments of the present invention employ both the notification method and the client-polling method for command propagation, and do so in a way to minimize the computational overhead associated with client polling. Moreover, different communications facilities are used for notification and polling, with the redundancy contributing to overall reliability.

Figure 5:
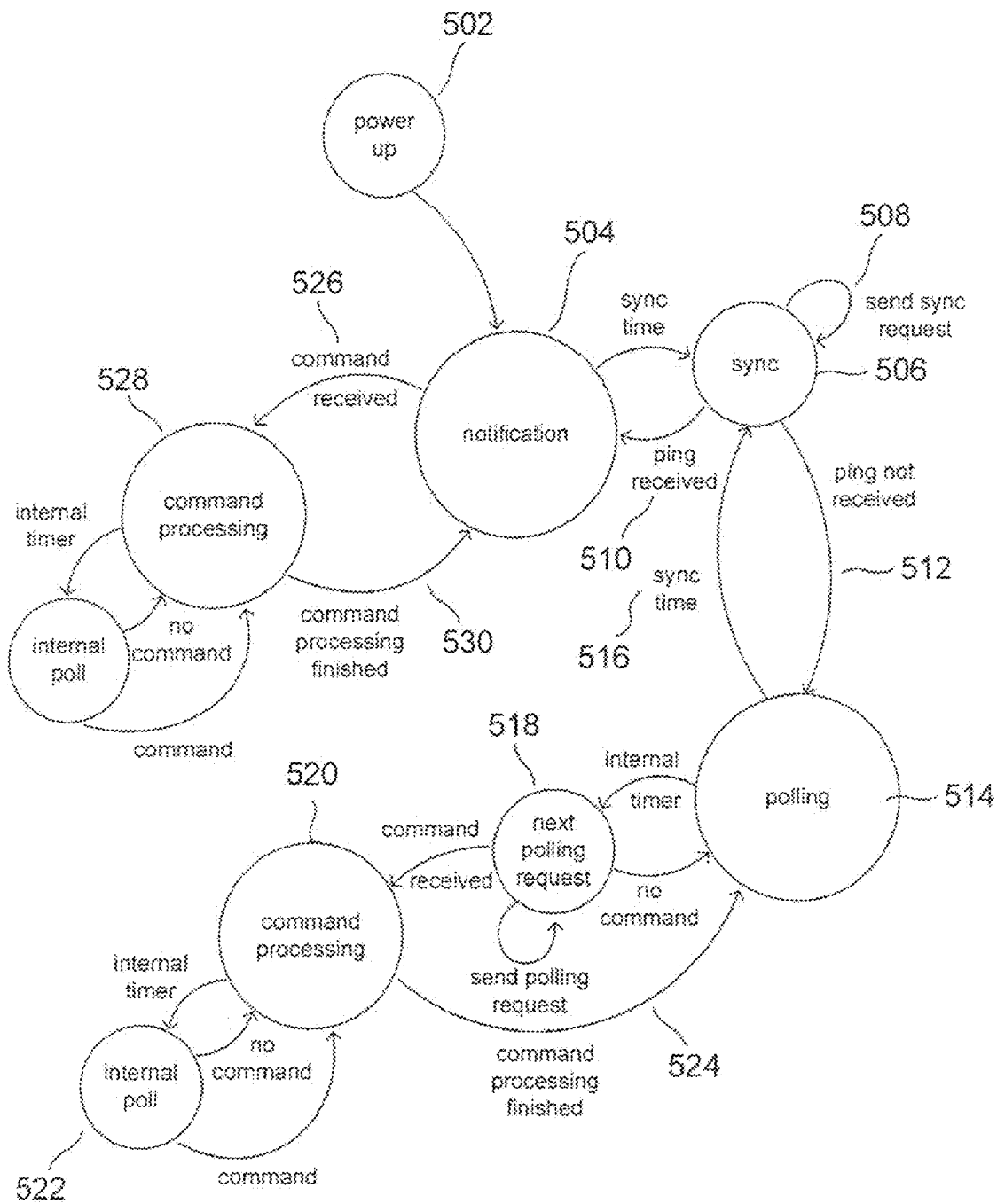
FIG. 5 is a state-transition diagram that represents the client side of a family of adaptive control protocols that represent embodiments of the present invention.

FIG. 5 is a state-transition diagram that represents the client side of a family of adaptive control protocols that represent embodiments of the present invention. In FIG. 5, and in FIG. 6, discussed below, each state is represented by a labeled disk, such as labeled disk 502, and state transitions are shown as arrows. Following power-up 502, the client-side adaptive control protocol ("ACP") enters the notification state 504 that represents notification-based command propagation. At very long intervals, the client-side ACP transitions to a sync state 506 in which the client-side ACP sends a synchronization request 508 to the server. When a response to the synchronization request is received by the client 510, the client-side ACP reverts to the notification state 504. When a response is not received from the server 512, then the client-side ACP transitions to the polling state 514. The polling state represents client-polling-based command propagation. From the polling state, the client-side ACP infrequently transitions 516 back to the synchronization state 506, in which the client-side ACP again sends a synchronization request to the server computer. Thus, when the notification-based command-propagation method is operational, as indicated by server responses to synchronization requests, the client-side ACP inhabits the notification state 504.

The client-side ACP frequently transitions from the polling state 514 to the next-polling-request state 518. In this state, the client-side ACP sends a polling request to the server. When indication of an available command is received in response to a polling request, the client-side ACP transitions to a command-processing state 520. Otherwise, the command-side ACP transitions back to the polling state 514. In the command-processing state 520, the client may carry out a variety of data exchanges with the server, including initially fetching the available command from the server. In the command-processing state 520, the client-side ACP also continues to poll, by a different mechanism, the server for commands, as represented by the internal poll state 522. In this case, reception of an indication of the availability of an additional command as well as an indication of no command being available both cause return to the command processing state 520. When execution related to command processing is finished, then the client-side ACP transitions 524 back to the polling state 514. From the notification state 504, the client-side ACP transitions 526 to a command-processing state 528 similar to command-processing state 520. The only difference in the two command-processing states is that, in the case of command-processing state 520, command completion results in transition back to the polling state 514, while in the case of command-processing state 528, command completion results in transition 530 back to the notification state 504.

To summarize, in embodiments of the present invention, the notification-based command-propagation mode is preferred but, when the notification process is inoperable, a client-polling-based method of command propagation is employed. As soon as the notification-based method again becomes operable, the notification method is again employed in preference to polling. In all cases, during command processing, a communications context is constructed by the client computer for data transfer between the client and server during command execution. During this time, the client computer uses that context for client-polling-based command propagation, since, for the duration of command processing, with a communications context already resident and functioning, client-polling command propagation does not represent significant additional computation burden.

Figure 6:
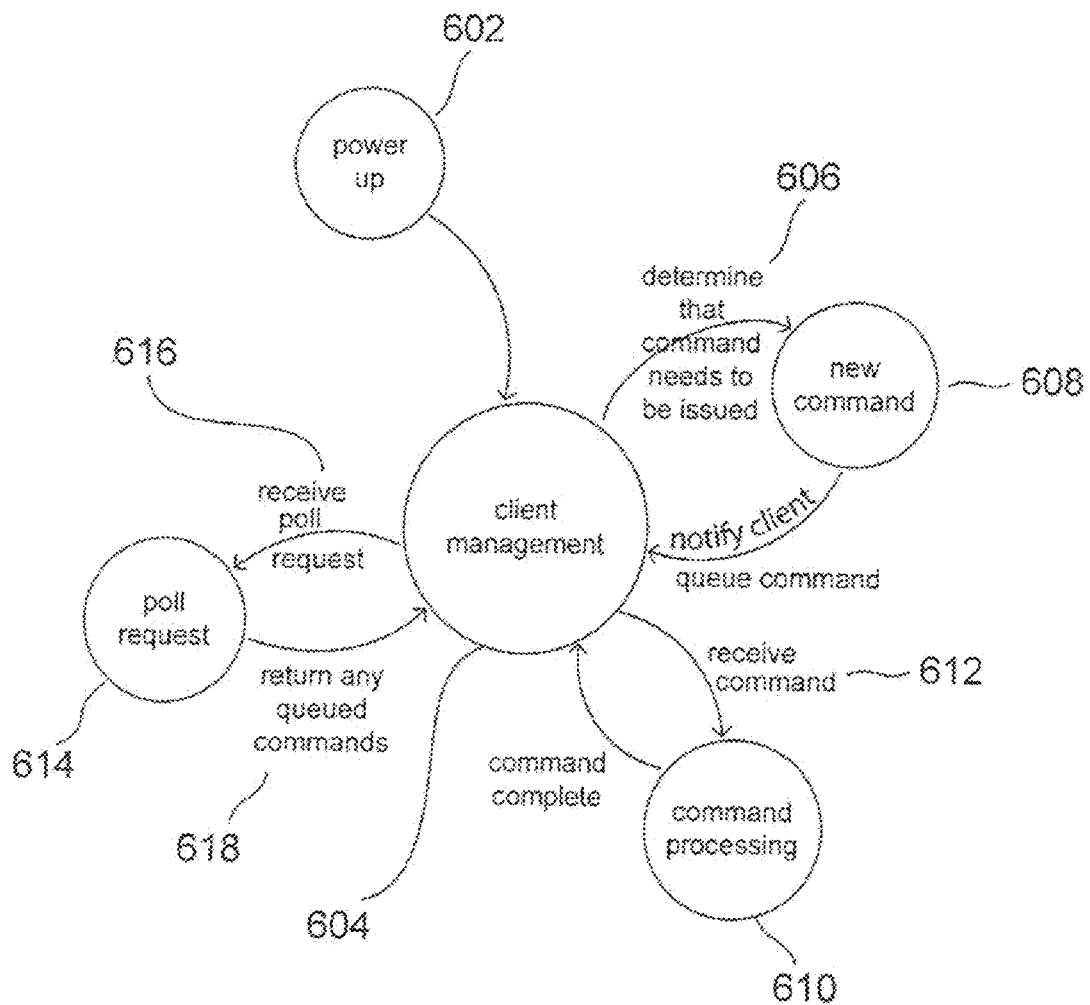
FIG. 6 is a state-transition diagram that represents the server side of a family of adaptive control protocols that represent embodiments of the present invention.

FIG. 6 is a state-transition diagram that represents the server side of a family of adaptive control protocols that represent embodiments of the present invention. Following power-up 602, the server enters a client-management state 604. When the server determines, during monitoring of policies and other information, that a command needs to be issued to a particular client computer, then the server-side ACP transitions 606 to a new-command state 608, and returns to the client-management state 604 by notifying the client of the new command and queuing the new command in a command queue resident on the server computer. The server-side ACP transitions to a command-processing state 610 upon receiving a command 612 from a client computer, and returns to the client-management state 604 when command processing is completed. Command processing may involve, for example, a number of data transfers or other such activities carried out by and/or on behalf of, the client computer.

It should be noted that the state-transition diagrams of FIG. 5 and FIG. 6 describe states with respect to a single server/client pair. In the case of the server computer, the server-side ACP may inhabit the command processing state 610 with respect to a particular client while inhabiting the client-management state 604 with respect to other client computers. Finally, the server-side ACP may transition to a poll-request state 614 upon receiving a poll request 616 from a client computer, and returns to the client-management state 604 upon returning indications of any queued commands for the client computer to the client computer 618.

The state-transition diagrams provided in FIGS. 5 and 6 are not intended to be sufficiently detailed to describe particular implementations of a particular ACP that represents an embodiment of the present invention, but are instead intended to describe, at a high level, the general method implemented in ACP's that represents embodiments of the present invention. In any particular implementation, there may be many more states and state transitions corresponding to the detailed processes by which client/server communications are carried out.

Figure 7:
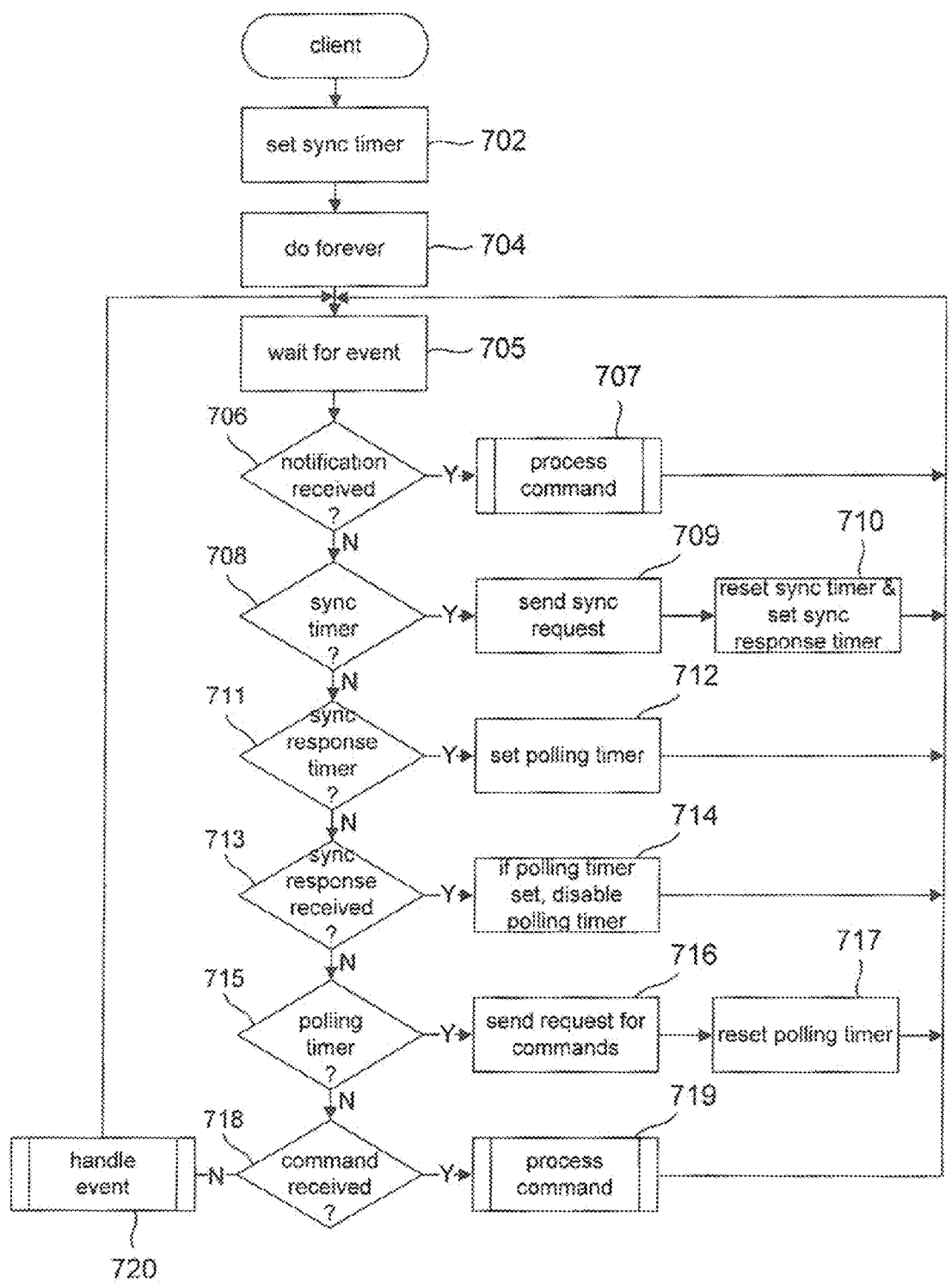
FIGS. 7-8 are control-flow diagrams that describe the client-side adaptive control protocols that represent embodiments of the present invention.
Figure 8:
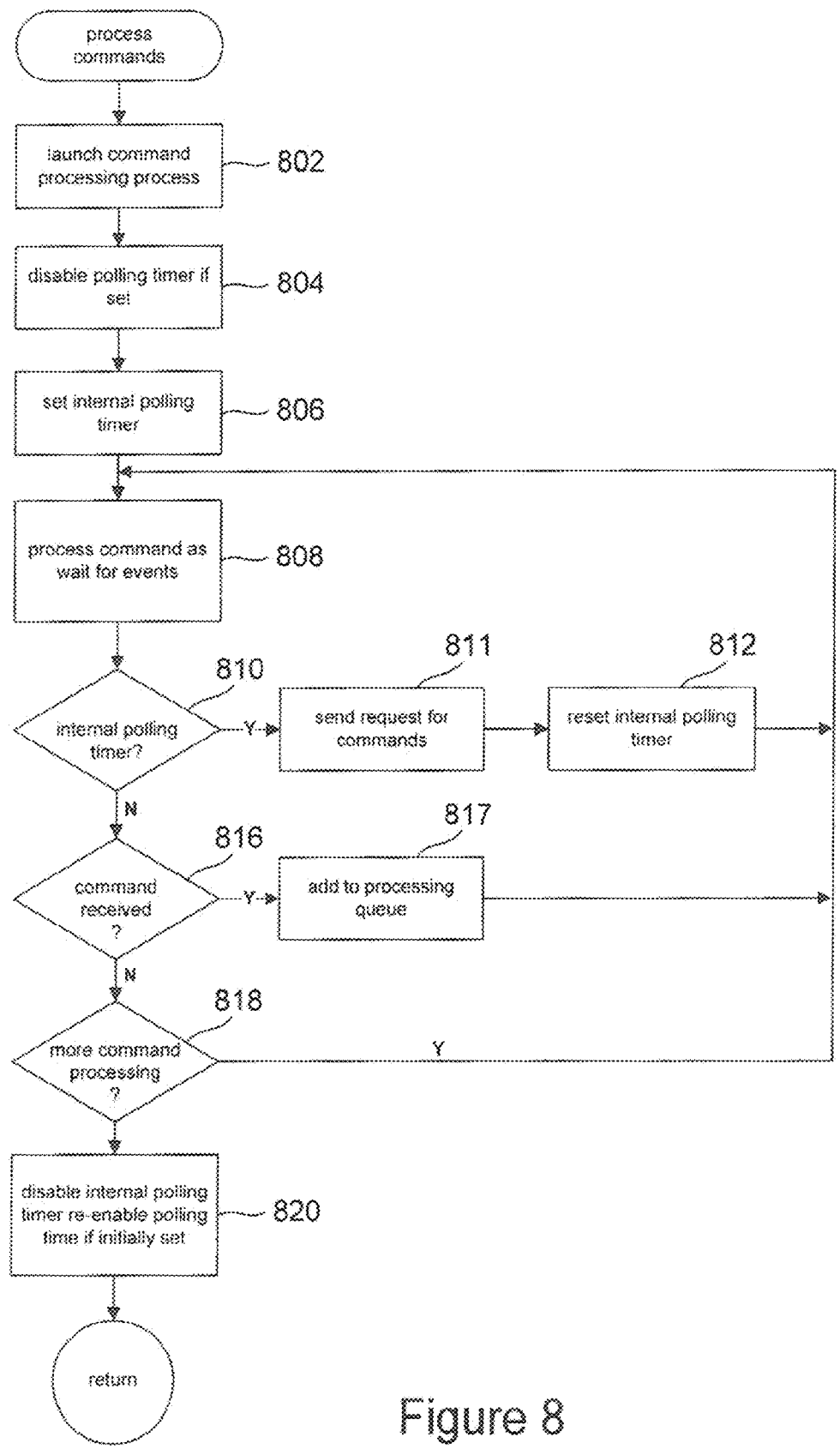

FIGS. 7-8 are control-flow diagrams that describe the client-side adaptive control protocols that represent embodiments of the present invention. FIG. 7 shows a client-side ACP at a high level, and FIG. 8 shows a routine called from the control-flow diagram shown in FIG. 7. Referring to FIG. 7, in step 702, the client-side ACP sets a synchronization timer. Note that, in this discussion, the term "timer" refers to any of various types of services or functionalities that allow a process to wait for a period of time before undertaking some time-related activity. Operating systems generally provide timer routines, but many other methods for timed waits can be used. Then, in the continuous loop of steps 704-720, the client-side ACP continuously receives and executes commands from a monitoring-and-management server. In step 705, the client-side ACP waits for a next event. Note that, while waiting for the next event, the client computer generally carries out many other tasks and executes a large number of other concurrent processes. If a notification event is received, as determined in step 706, then the client-side ACP calls the routine "process command," in step 707. that routine is described below with reference to FIG. 8. Otherwise, if a synchronization-timer expiration is detected, in step 708, then the client-side ACP sends a synchronization request to the server, in step 709, and, in step 710, resets the synchronization timer and sets a synchronization-response timer. Otherwise, if the event is a detection of expiration of a synchronization-response timer, as determined in step 711, then, in step 712, the client-side ACP sets a polling timer. Otherwise, if the event corresponds to reception of a synchronization response from the server, as determined in step 713, then, when the polling timer is set, the polling timer is disabled, in step 714. Otherwise, the event corresponds to a polling-timer expiration, as determined in step 715, then, in step 716, the client-side ACP sends a polling request to the server and resets the polling timer, in step 717. Otherwise, when the server has sent, in a polling-request response, an indication that a command is available on the server for the client, as determined in step 718, then the routine "process command" is invoked, in step 719. Otherwise, if some other type of event has occurred, then that event is handled in step 720.

Thus, when the notification-based command propagation method is available, the client waits for notification of the availability of a command on the server, and calls the routine "processCommand," in step 707, to fetch and execute the command. When notification is inoperable, as detected by expiration of a synchronization-response timer, then client-polling is launched by setting a polling timer, in step 712, with command-availability indications returned in response to polling received in step 718. Whenever a synchronization-request response is received, then polling is disabled, in step 714.

FIG. 8 is a control-flow diagram for the routine "process commands" called in steps 707 and 719 of the control-flow diagram shown in FIG. 7. In step 802, the client computer launches a command-processing process or thread in order to fetch and process a command indicated to be available on the server. In step 804, the routine "process commands" disables the client-polling timer, set in step 712 of FIG. 7, when that timer has been set. In step 806, the client-side ACP sets an internal polling timer. In a loop comprising steps 808, 810-812, and 816-818, the client side ACP processes the command as well as handles various ACP events. Processing of the command, in step 808, may involve data transfers, computation on the client, computation on the server, or computation both on the client and server, and many other types of activities. For example, execution of a backup request may involve fetching the backup request from the server by the client, marshalling the data by the client, and sending the data to the server in a sequence of data-transfer steps. The server receives the data transfers, processes the data-transfer messages to extract the data for back up, may compress the data or otherwise transform the data for efficient storage, and may then store the data on a mass-storage device. Such details are beyond the scope of the present discussion, and omitted both from the state-transition diagrams previously discussed and from the currently discussed control-flow diagrams. While a command is fetched and processed, in step 808, additional events may occur. When an internal-polling-timer expiration is detected, in step 810, the client-side ACP sends a request for commands to the server, in step 811, and resets the internal polling timer in step 812. When a server responds to a polling request from the client, made in step 811, with an indication that an additional command is available, as determined in step 816, that indication is added to a queue internal to the client, in step 817, so that that command will be subsequently processed in step 808 after the currently processed command is finished. If more command processing is needed, as determined in step 818, then control flows back to step 808. Otherwise, in step 820, the client-side ACP disables the internal polling timer and re-enables the client-polling timer when that timer was initially set when the routine "processCommands" was called.

Figure 9:
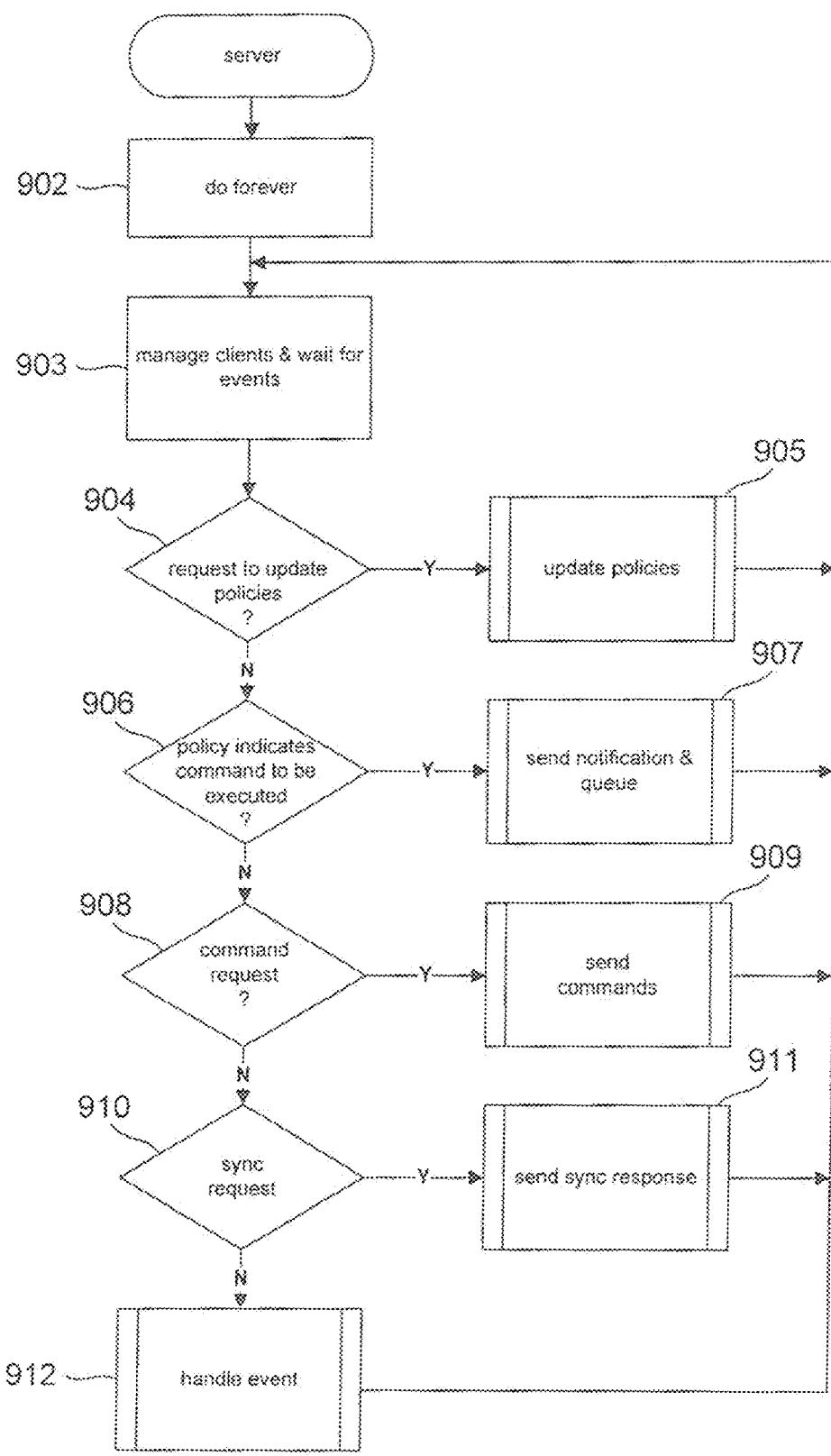
FIG. 9 is a control-flow diagram for the server-side adaptive control protocols that represent embodiments of the present invention.

FIG. 9 is a control-flow diagram for the server-side adaptive control protocols that represent embodiments of the present invention. This control-flow diagram comprises an endless loop of steps 902-912. In step 903, the server executes the client-management routines that continuously monitor policies and other information and wait for events. If a request to add or update policies is received, in step 904, then the server undertakes policy addition, update, or other policy management tasks in step 905. Such requests generally arise through an administration interface provided by the management routines. When management routines generate an event responding to the need for a command to be executed, as determined in step 906, then the server-side ACP sends the notification to the corresponding client computer, and queues the command, in step 907. When the server-side ACP receives a command request from a client computer, as determined in step 908, then, in step 909, the server-side ACP sends an indication of the command or commands queued for the client computer to the client computer. When the server-side ACP receives a synchronization request from a client computer, as determined in step 910, then, in step 911, the server computer responds to the client computer with a synchronization response. Other events are handled collectively in step 912.

Figure 10:
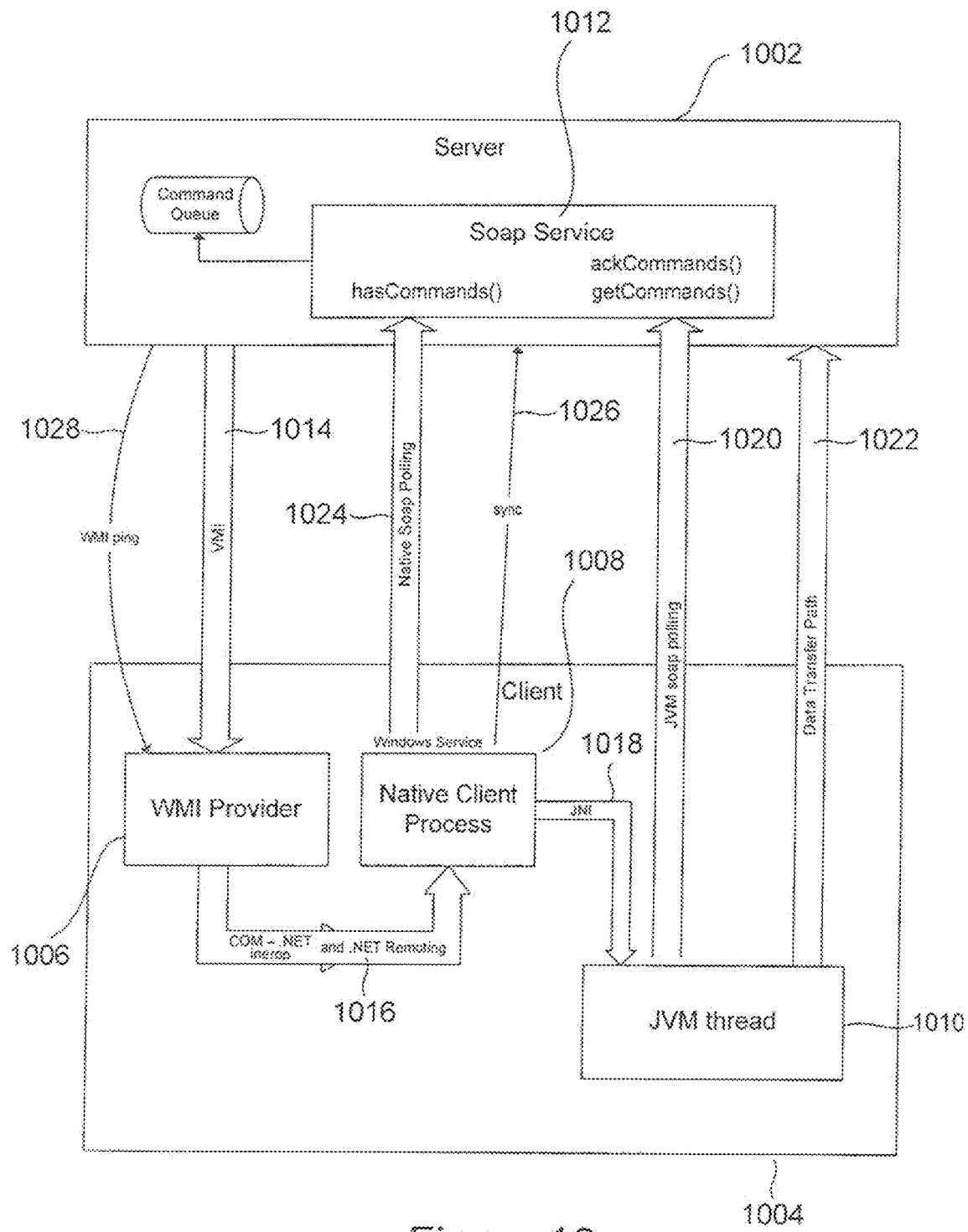
FIG. 10 illustrates one embodiment of the present invention.

FIG. 10 illustrates one embodiment of the present invention. A monitoring-and-management server is represented by rectangular box 1002, and a client computer managed and monitored by the server is represented by rectangular box 1004. The client computer includes a Windows-Management-Instrumentation ("WMI") provider 1006, a native client process 1008, and intermittently, a Java-Virtual-Machine ("JVM") thread 1010 that is invoked for processing one or more specific commands. The server 1002 implements the WMI service, as well as a simple-object-access protocol ("SOAP") service 1012. WMI services and providers are standard components, implemented by Microsoft, of many server and client computers. WMI was developed to facilitate exchange of management information between computers. WMI comes with a standard set of automation interfaces, .NET management interfaces, DOM/DCOM programming interfaces, remoting capabilities, query support, event notification functions, a code template generator, and many other features. WMI is therefore an existing communications component that provides mechanism for a server to notify a client asynchronously of the availability of commands for the client. A WMI provider is generally available on client computers and is implemented as a dynamically linked library. The presence of a WMI provider does not constitute computational overhead for the client computer. Thus, the notification-based portion of the ACPs that represent embodiments of the present invention may be implemented as WMI-facilitated event notification service. The native client process 1008 generally implements the client-side ACP. The native client process may employ the SOAP protocol for exchanging XML-based messages to a server computer. The SOAP protocol is also an existing communications component that provides an alternative communications path from the client to the server computer. JVM threads, 1010, are launched on a per-command basis to process commands, and communicate with the server through the JVM soap protocol and through a separate data-transfer path.

When the server 1002 determines that a next command needs to be processed by a client, the server can notify the client via the WMI event-notification facility 1014. The WMI provider 1006 receives the event, and notifies the native client process 1008 through the NET corn and remoting facilities 1016. The native client process 1008 can then invoke a JVM thread 1010 through the Java Native Interface 1018 to fetch the command from the server, using the JVM SOAP protocol 1020, and can execute the command using an alternative data-transfer path 1022, such as various file transfer protocols that allow data to be transferred through the Internet. When notification through the WMI event-notification facility 1014 is unavailable, due to construction of a firewall or other such event, the native client process can poll for commands using a native SOAP-based polling 1024. In addition, the native client process can use native SOAP polling to send synchronization requests 1026 to the server, which responds via the WMI facility 1028.

Although the present invention has been described in terms of particular embodiments, it is not intended that the invention be limited to these embodiments. Modifications within the spirit of the invention will be apparent to those skilled in the art. For example, the client/server ACPs that represent embodiments of the present invention may be implemented using any number of existing communications components, in addition to, or instead of, those discussed with reference to FIG. 10, and can be implemented de novo, when needed. These communications components can be implemented in any number of different programming languages using different code modularization, data structures, control structures, variables, and other such programming parameters. The communications between the client and server may be carried out over any number of different underlying communications services hardware and lower-level software components within the client and server computers. Polling intervals, synchronization-request intervals, and other such parameters may be adjusted to achieve desired adaptation responses with desired levels of computational overhead. The client/server ACPs that represent embodiments of the present invention are easily extended to distributed monitoring-and-management systems involving multiple server computers, including multi-processor server computers, and other complex environments.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A client-computer monitoring-and-management system comprising:
 a monitoring-and-management server computer that generates commands for propagation to a client computer;
 a client computer that receives commands from the monitoring-and-management server, each command representing a management task that the monitoring-and-management server has identified as needing to be executed by the client computer; and
 an adaptive client/server control protocol that
  determines whether a server-to-client asynchronous notification facility is operational,
  when the server-to-client asynchronous notification facility is determined to be operational, asynchronously delivers command-availability notification from the monitoring-and-management server to the client computer, and when the server-to-client asynchronous notification facility is determined to not be operational, provides for polling of the monitoring-and-management server computer by the client computer in order for the client computer to detect commands generated by the monitoring-and-management server computer by receiving command notification through monitoring-and-management server responses to poll requests sent by the client computer.

2. The client-computer monitoring-and-management system of claim 1 wherein the monitoring-and-management server monitors policies and management information stored on, or accessible to, the monitoring-and-management system in order to determine when to generate a command, and queues generated commands to a command queue in addition to asynchronously delivering a command-availability notification to the client computer.

3. The client-computer monitoring-and-management system of claim 2 wherein, upon receiving a poll request from the client computer, the monitoring-and-management server computer returns a response to the poll request containing an indication of the availability of commands previously queued by the monitoring-and-management server for the client computer.

4. The client-computer monitoring-and-management system of claim 1, wherein the determination, by the adaptive client/server control protocol, whether or not the notification facility is operational comprises:

periodically sending a synchronization request from the client computer to the monitoring-and-management server computer;

when a response to the synchronization request is received by the client computer through the notification facility, determining the notification facility to be operational; and when a response to the synchronization request is not received by the client computer through the notification facility, determining the notification facility to be not operational.

5. The client-computer monitoring-and-management system of claim 1 wherein the client computer polls the monitoring-and-management server computer through a second communications facility distinct from the notification facility.

6. The client-computer monitoring-and-management system of claim 5 further comprising:

upon receiving, by the client computer, notification of command availability or receiving a poll-request response indicating command availability, launching by the client computer of a command-processing thread;

requesting the command from the monitoring-and-management server by the command-processing thread;

receiving the command by the command-processing thread from the monitoring-and-management server; and executing the received command by the command-processing thread.

7. The client-computer monitoring-and-management system of claim 6 wherein, once launched by the client computer, the command-processing thread polls the monitoring-and-management server for additional commands through a third communications facility distinct from the second communications facility and from the notification facility.

8. The client-computer monitoring-and-management system of claim 1 wherein a windows management instrumentation service, on the monitoring-and-management server computer, and a windows management instrumentation provider, on the client computer, together provide the notification facility; and wherein the client computer polls the monitoring-and-management server computer through a simple object access protocol.

9. The client-computer monitoring-and-management system of claim 1 wherein upon receiving, by the client computer, notification of command availability or receiving a poll-request response indicating command availability, the client computer launches a Java virtual machine thread to process the command.

10. The client-computer monitoring-and-management system of claim 1 wherein multiple monitoring-and-management servers cooperate to monitor and manage multiple client computers.

11. A method for propagating commands from a monitoring-and-management server computer to a client computer, the method comprising:

generating commands by the monitoring-and-management server computer;

queuing generated commands by the monitoring-and-management server computer in a command queue;

sending an asynchronous notification by the monitoring-and-management server computer to the client computer when a command is generated;

determining whether a server-to-client asynchronous notification facility of the protocol is operational;

when the server-to-client asynchronous notification facility is determined to be operational, receiving the asynchronous notification from the monitoring-and-management server by the client computer; and when the server-to-client asynchronous notification facility is determined to not be operational, polling, by the client computer, the monitoring-and-management server computer to detect commands generated by the monitoring-and-management server computer.

12. The method of claim 11 wherein the monitoring-and-management server monitors policies and management information stored on, or accessible to, the monitoring-and-management system in order to determine when to generate a command.

13. The method of claim 11 wherein polling, by the client computer further comprises:

periodically sending poll requests to the monitoring-and-management server computer; and receiving poll-request responses from the monitoring-and-management server computer.

14. The method of claim 13 wherein, upon receiving a poll request from the client computer, the monitoring-and-management server computer returns a response to the poll request containing an indication of the availability of commands previously queued by the monitoring-and-management server for the client computer.

15. The method of claim 11, wherein the act of determining by the adaptive client/server control protocol, whether or not the notification facility is operational comprises:

periodically sending a synchronization request from the client computer to the monitoring-and-management server computer;

when a response to the synchronization request is received by the client computer through the notification facility, determining the notification facility to be operational; and when a response to the synchronization request is not received by the client computer through the notification facility,
  determining the notification facility to be not operational.

16. The method of claim 11 wherein the client computer polls the monitoring-and-management server computer through a second communications facility distinct from the notification facility.

17. The method of claim 16 further comprising:

upon receiving notification of command availability or receiving a poll-request response indicating command availability, the client computer,
  launching by the client computer of a command-processing thread;
  requesting the command from the monitoring-and-management server by the command-processing thread;
  receiving the command by the command-processing thread from the monitoring-and-management server; and
  executing the received command by the command-processing thread.

18. The method of claim 17 wherein, once launched by the client computer, the command-processing thread polls the monitoring-and-management server for additional commands through a third communications facility distinct from the second communications facility and from the notification facility.

19. The method of claim 11
  wherein a windows management instrumentation service, on the monitoring-and-management server computer, and a windows management instrumentation provider, on the client computer, together provide the notification facility; and
  wherein the client computer polls the monitoring-and-management server computer through a simple object access protocol.

20. The method of claim 11
  wherein upon receiving, by the client computer, notification of command availability or receiving a poll-request response indicating command availability, the client computer launches a Java virtual machine thread to process the command.

* * * * *